United States Patent [19]

Grenier et al.

[11] Patent Number: 4,710,028
[45] Date of Patent: Dec. 1, 1987

[54] SYSTEM FOR LOCATING A BODY IN MOTION

[75] Inventors: Gilles Grenier, L'Hay-Les-Roses; Jérôme Maffert, Versailles; Jean-Pierre Merle, Orsay; Jacques R. des Ordons, Savigny, all of France

[73] Assignee: Aerospatiale Societe Nationale Industrielle, Paris, France

[21] Appl. No.: 869,302

[22] Filed: Jun. 2, 1986

[30] Foreign Application Priority Data

Jun. 17, 1985 [FR] France ............... 85 09158

[51] Int. Cl.$^4$ ........................... G01B 11/26
[52] U.S. Cl. ........................ 356/375; 356/141; 356/152
[58] Field of Search .......... 356/141, 152, 375, 373

[56] References Cited

U.S. PATENT DOCUMENTS 4,419,012 12/1983 Stephenson et al. ............ 356/141
4,424,943 1/1984 Zwirn et al. ..................... 44/3.11

FOREIGN PATENT DOCUMENTS 2334079 7/1977 France .
0109973 8/1980 Japan ............................. 356/141
2122833 1/1984 United Kingdom .

Primary Examiner—F. L. Evans
Attorney, Agent, or Firm—Fisher Christen & Sabol

[57] ABSTRACT

This invention relates to a system for locating a body in motion with respect to an axis, comprising an optical detector disposed in fixed manner and cooperating with an optical emitter connected to said body in motion, system wherein said optical detector comprises a fixed matrix of controllable photosensitive elements; said optical emitter produces flash signals; and synchronization means are provided for said electronic control means to deliver control pulses synchronized with said flash signals and triggering off the taking of an image. The invention is more particularly applicable to the location and guiding of missiles.

8 Claims, 6 Drawing Figures

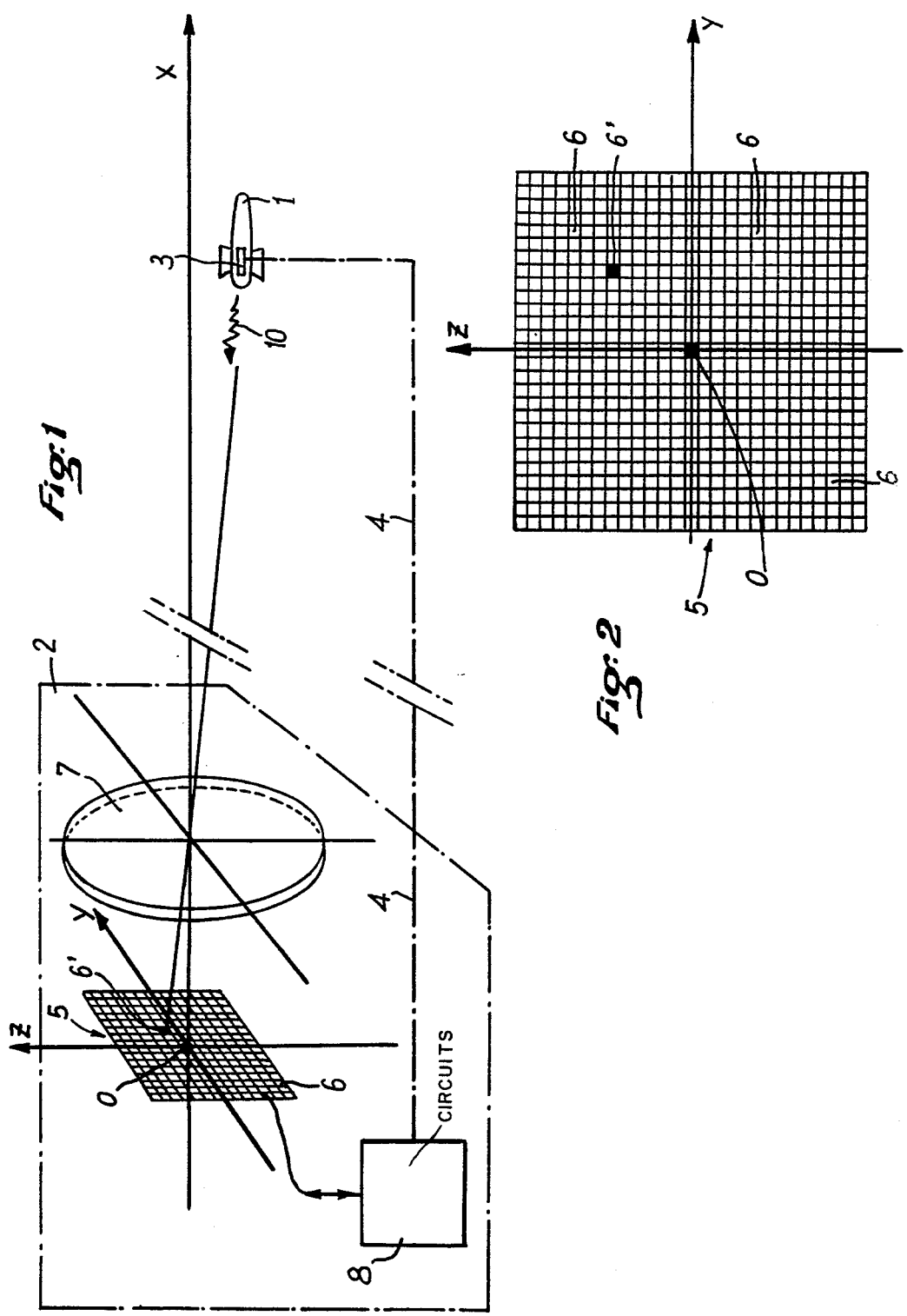

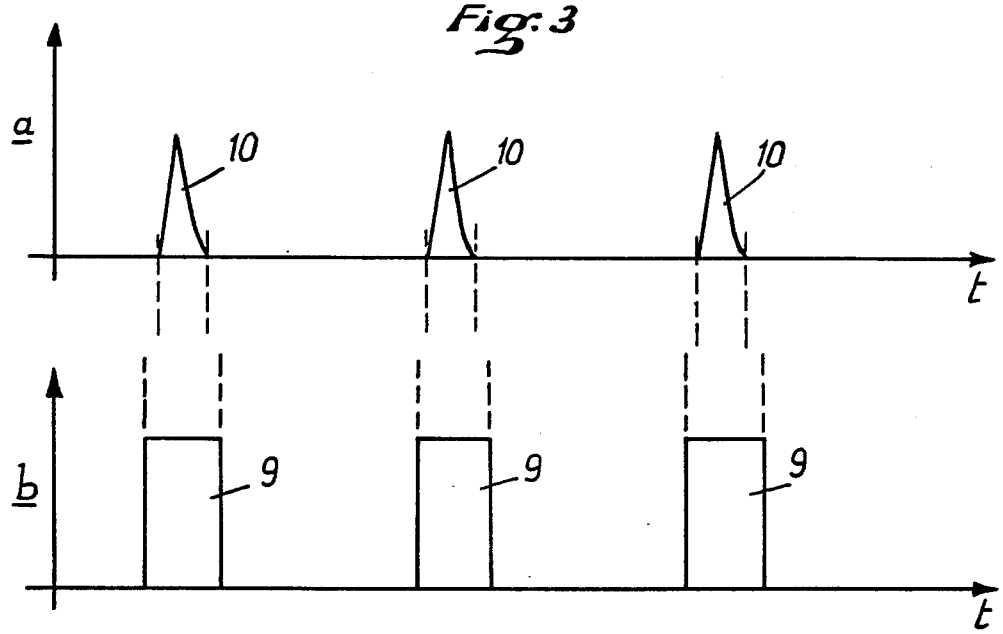
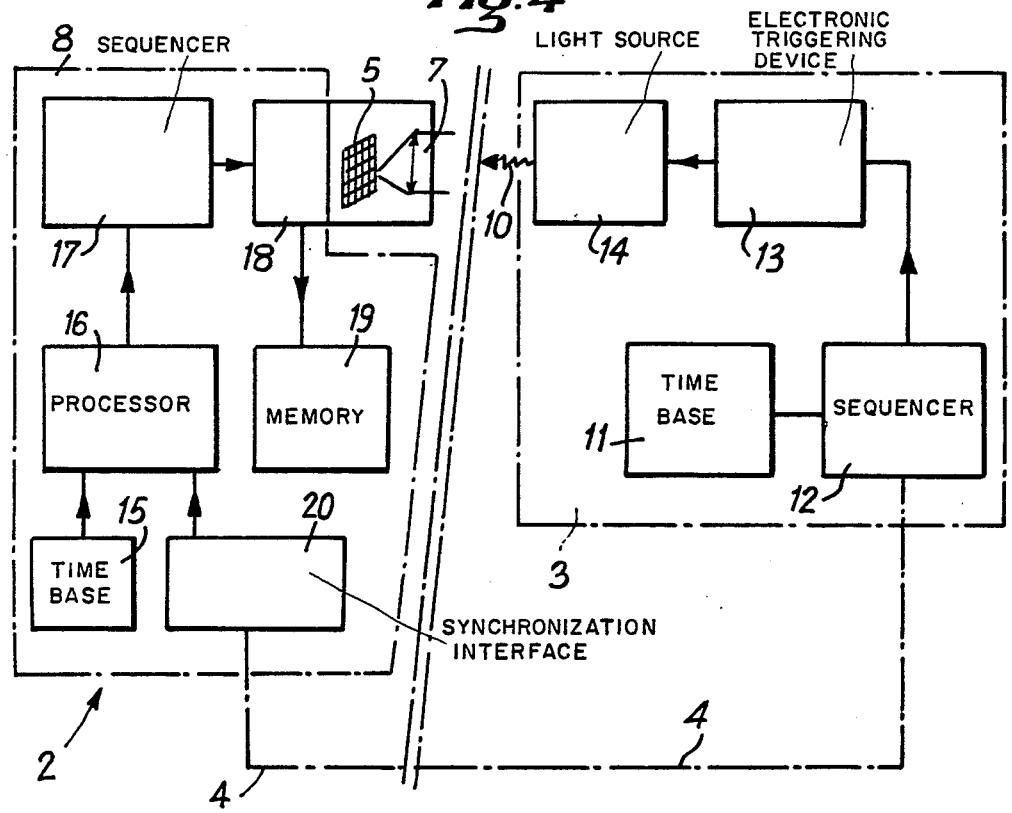

Fig: 5
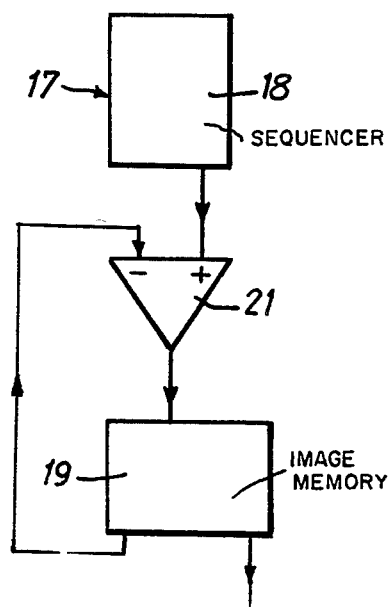
Fig: 6
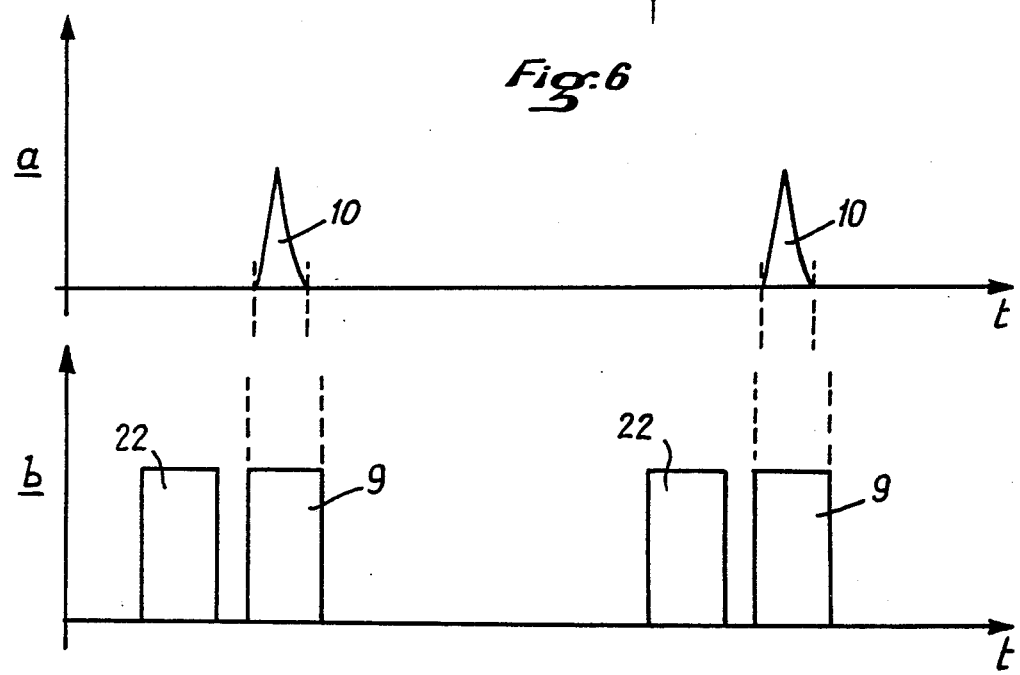

SYSTEM FOR LOCATING A BODY IN MOTION

The present invention relates to a system for locating a body in motion. It is particularly, but not exclusively, appropriate for the location and guiding of missiles, for example anti-tank missiles.

In order to locate a missile with respect to an axis, which constitutes for example the line of sight of a weapon system, a system is already known which comprises an optical detector, for example a simple telescopic sight, mounted in fixed manner and cooperating with an optical emitter, for example a luminous tracer, connected to said body in motion. Although mounted in fixed manner, the optical detector is adapted to be oriented; it may thus be directed at each instant towards the optical emitter. This results in that the instantaneous orientation of the optical detector with respect to a reference axis is representative of the position of said missile with respect to this axis.

Such a known system of location therefore presents the drawback that the optical detector must be oriented continuously in order to follow the missile, this necessitating the action of an operator for the whole duration of flight of the missile. Moreover, sensors must be provided on said optical detector so that the orientation thereof can produce electric signals representative of the position of the missile and capable of being used for guiding same.

Certain so-called second generation weapon systems ensure location of the missile and guiding thereof with respect to the axis of sight defined by the firer.

The link between the firing station and the missile is established between a detector harmonized with the line of sight and an optical source connected to the missile of which the signature must be characteristic.

The characteristic of this signature may be:
the emission spectrum of the source,
the power emitted with respect to the parasitic signal corresponding to the background,
the emission frequency of the source,
or the emission phase of the source.

The known systems of location do not enable all the criteria of recognition defined hereinabove to be used simultaneously.

It is an object of the present invention to overcome these drawbacks.

To this end, according to the invention, the system for locating a body in motion with respect to an axis, comprising an optical detector disposed in fixed manner and cooperating with an optical emitter connected to said body in motion, is noteworthy in that:
said optical detector comprises, on the one hand, a fixed matrix of controllable photosensitive elements, of which the plane is at least substantially at right angles to said axis and which is associated with an optical system adapted to form on said matrix an image of the environment of said axis in which said body in motion is capable of moving and, on the other hand, electronic means for controlling said photosensitive elements;
said optical emitter produces flash signals; and
synchronization means are provided for said electronic control means to deliver control pulses synchronized with said flash signals and setting off the taking of an image.

In this way, the position of the body in motion with respect to said axis is given by the position of the or each photosensitive element of the matrix energized by the image of the flash signals with respect to said axis. Pursuit of the body in motion by means of an orientable optical detector and sensors associated with the orientation of said optical detector may therefore be dispensed with.

Furthermore, since operation of the system according to the invention is pulse-like and not continuous, a particularly high signal-to-noise ratio may be obtained. In fact, thanks to the invention, it is possible to take images whose duration is equal to that of the source flashes and which are synchronized in frequency and in phase with the light emission.

In this way, the synchronization of the source of the detector and of the source makes it possible for said detector to function with a useful signal level close to the peak value of the power of the emitter.

The link may therefore function with a high signal-to-noise ratio, for a low average power, which makes it possible to limit consumption and cost of the source.

The photosensitive elements are advantageously of the charge transfer type, generally abbreviated to CCD, of which the sampled output signal is particularly adapted to digital processing.

It will be noted that the optical emitter producing flash signals and connected to the body in motion may be a light beacon or a simple mirror receiving flash signals from a fixed beacon and returning said flashes towards the optical detector.

Synchronization between the optical detector and the optical emitter may be obtained by permanent link means or by temporary link means, said optical detector and emitter in that case comprising means (time base) for maintaining said synchronization individually.

The flash signals and therefore the pulses controlling said electronic means for controlling the photosensitive elements, may be repeated periodically or in accordance with any other law desired. However, in order to make a coding in frequency and in phase of the link and to obtain protection against natural or artificial jammers, the optical emitter and detector may be triggered off in random or pseudo-random manner.

It will be noted that the system according to the invention functioning with a high signal-to-noise ratio, it is possible to limit it to a simple processing of the image given by the matrix of photosensitive elements, whilst conserving a good immunity to possible natural or artificial jammers.

In order further to improve the position information furnished by said optical detector, an additional temporal pulse closely preceding and/or following each of the temporal locating pulses corresponding to a flash, makes it possible to trigger off a reference shot under the same conditions as that synchronized on the flash.

The system comprises means for comparing the information furnished by said matrix for each couple of one locating pulse and one additional pulse associated together. In this way, the additional pulse makes it possible to establish a reference image of the field in which the missile is moving and a comparison of this information makes it possible to eliminate the parasitic sources possibly present in this field.

Such a comparison also enables defects of the optical detector to be automatically compensated, such as obscurity level, spatial noise, singular points, poor transfers, lack of uniform response, etc. It therefore makes it possible to reduce the requirements of quality of the detector and to obtain operation at high temperature without compensation of gain.

It will be noted that the system according to the invention may locate several bodies in motion simultaneously, provided that the flashes coming therefrom are discriminated temporally. The system according to the invention therefore enables angular deviation measurement of a plurality of bodies in motion to be effected.

The invention will be more readily understood on reading the following description with reference to the accompanying drawings, in which:

FIG. 1 is a schematic view illustrating the system of location according to the invention.

FIG. 2 is a schematic front view of the matrix of photosensitive elements used in the system of FIG. 1.

FIGS. 3a and 3b illustrate the operation of the system of FIG. 1 as a function of time t.

FIG. 4 is the block diagram of an embodiment of the system of FIG. 1.

FIG. 5 shows a variant embodiment of the system of FIG. 4.

FIGS. 6a and 6b illustrate the operation of the variant embodiment of FIG. 5 as a function of time t.

Referring now to the drawings, the embodiment of the system of location according to the invention, shown in FIG. 1, is intended continuously to indicate the position of a missile 1 with respect to an axis OX which, for example, represents the line of sight of an anti-tank weapon system (not shown) equipped with said location device.

The system of location is essentially constituted by an optical detector 2 arranged in fixed manner, for example in said weapon system, by an emitter or pulsed light beacon 3 borne by said missile 1, as well as by a synchronization link 4 connecting the fixed detector 2 and the mobile beacon 3.

The fixed detector 2 essentially comprises a matrix 5 of photosensitive elements 6, for example of the charge transfer (CCD) type, an optical system 7 and electronic circuits 8 for using the matrix 5.

In the matrix 5, the photosensitive elements are disposed in a coplanar arrangement of lines and columns, respectively parallel to an axis OY and to an axis OZ. Point O is for example the centre of the matrix 5 and axes OX, OY and OZ form a system of rectangular axes of which axis OX is at right angles to the plane of the matrix 5, whilst axes OY and OZ are coplanar with respect to said matrix.

The optical system 7 is capable of forming on matrix 5 the image of the space surrounding axis OX.

The electronic circuits 8 make it possible to read the charges produced by the photosensitive elements 6 during temporal pulses 9 (cf. FIG. 3b), i.e. to take successive images of the space surrounding axis OX. The duration of exposure of matrix 5, i.e. the duration of said temporal pulses 9 and of said image shots, is short and corresponds to the integration time of the photons on the sensitive zones of elements 6. It may be of the order of 50 microseconds.

The pulses 9 may be periodical; however, their instants of appearance are not necessarily temporally equidistant, with the result that said pulses appear in accordance with a temporal law different from the periodicity, or in random manner.

The light beacon 3 comprises a source of pulses capable of emitting flashes 10 of visible or infra-red light. For example, this source is a xenon lamp provided with a concentrating optical system or a generator or laser diode with or without optical system.

The flashes 10 are of short duration, for example of the order of 20 microseconds.

Said source of pulses is preferably equipped with a filter of small spectral width, limiting the radiation of the beacon 3. Similarly, an identical filter is associated with the optical system 7 of the detector 2, so as to eliminate the radiation outside the emission band of the beacon 3 and to allow spectral separations which may possibly be desired.

Thanks to the synchronization link 4, the emission of flashes 10 by beacon 3 is synchronized with the taking of images effected by matrix 5, triggered off by circuits 8. This is illustrated in FIGS. 3a and 3b which show that the temporal pulses 9 are synchronized with flashes 10. Moreover, the duration of each temporal pulse 9 is at least equal to that of flashes 10 so that each flash is entirely covered temporally by a pulse 9.

The synchronization link 4 between detector 2 and beacon 3 may be permanent, for example in the form of an unwindable wire or a hertzien or optical link. It may also be temporary: in that case, detector 2 and beacon 3 comprise stable clocks capable of maintaining synchronization of the pulses 9 for taking images and the flashes 10 during the whole flight of said missile.

In this way, whenever a flash 10 is emitted by beacon 3, detector 2 is active, with the result that this flash strikes at least one element 6' of the matrix 5. This energized element 6' therefore constitutes the image of the flash 10 seen by detector 2. Since flash 10 is connected with missile 1, the coordinates of energized element 6' with respect to axes OY and OZ are characteristic of the position of said missile 1 with respect to axis OX.

From the coordinates of said energized element 6', circuits 8 may elaborate a signal representative of said position and possibly intended to correct the path of said missile.

FIG. 4 schematically shows an embodiment of the system according to the invention. It shows that the optical emitter 3 comprises a time base 11 supplying a sequencer 12, controlling an electronic triggering device 13 which, itself, controls the light source 14 emitting the flashes 10. The electronic circuits controlling the optical detector 2 comprise a time base 15 connected to a processor 16 activating an image-acquisition sequencer 17. The sequencer 17 controls an electronic device 18 for implementing the matrix 5 and is associated with an image memory 19. An interface device 20 makes it possible to ensure synchronization between the optical emitter 3 and the optical detector 2, via the synchronization link 4.

As shown in FIG. 5, between the electronic device 18 for implementing the matrix 5 and the image memory 19, a comparator 21 may be interposed. Functioning of the system according to the invention is illustrated in FIG. 6 which shows that, with each temporal pulse 9 for shooting a flash 10, there is associated a temporal pulse 22 for shot-taking, offset with respect to said flashes 10. In this way, the pulses 22 for controlling the matrix 5 correspond to shots of the field in which the missile 1 moves. Consequently, the comparator 21 delivers at its output a signal corresponding solely to one flash 11, the background of the field being eliminated since, each time, the shot-taking signal corresponding to a pulse 22 is subtracted from the shot-taking signal corresponding to the pulse 9 associated therewith.

The signal stored in the memory 19 after pulse 9 therefore contains only the information concerning the corresponding flash 10. Location of the missile 1 may therefore be particularly precise.

What is claimed is:

1. A tracking device for locating a flying body, such as a missile, within the line of sight of said tracking device, said tracking device comprising:
   a fixed planar matrix of controllable photosensitive elements, the plane of which is at least substantially at right angles with said line of sight;
   electronic means for controlling said photosensitive elements;
   an optical system for forming an optical image of said flying body onto said fixed planar matrix;
   an optical emitter producing flash signals being carried by said flying body and synchronization means being provided for said electronic control means to deliver control pulses triggering off the taking of images synchronized with said flash signals.

2. The tracking device of claim 1, wherein said control pulses cover temporally the whole of said flash signals.

3. The tracking device of claim 1, wherein, with each control pulse there is associated an additional, temporally close control pulse produced outside of any flash signal, and
means are provided for comparing the electric signals furnished by said matrix during a control pulse and during the additional control pulse associated therewith.

4. The tracking device of claim 1, wherein said photosensitive elements are of the charge transfer type.

5. The tracking device of claim 1, wherein synchronization between said optical emitter and said optical detector is obtained by a permanent link.

6. The tracking device of claim 1, wherein synchronization between said optical emitter and said optical detector is obtained by temporary link means and means are provided for maintaining said synchronization after rupture of said temporary link.

7. The tracking device of claim 1, wherein the flash signals are periodical.

8. The tracking device of claim 1, wherein the flash signals appear at pseudo-random instants.

* * * * *